Nov. 30, 1954     E. L. VALENTINE     2,695,453
DIP STICK LIQUID MEASURING APPARATUS
Filed Nov. 28, 1951
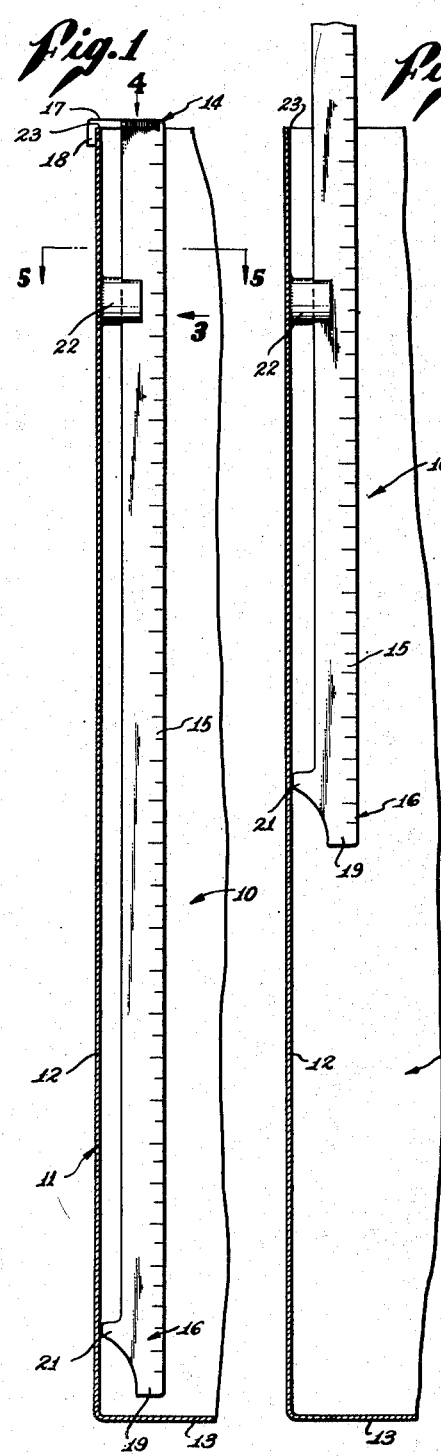
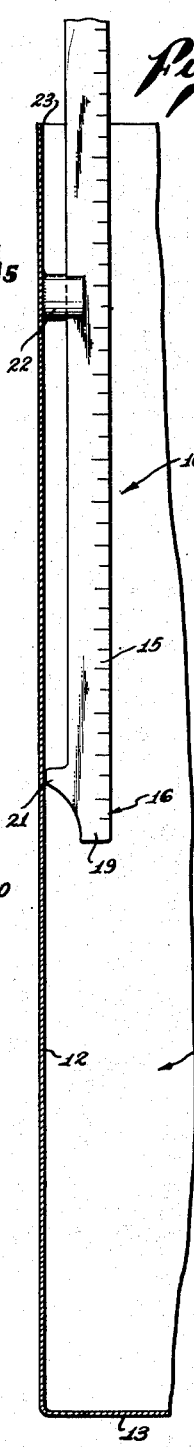
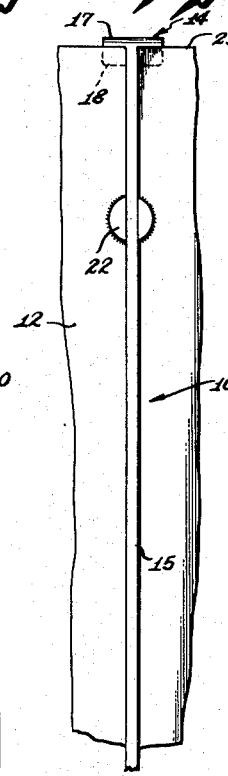
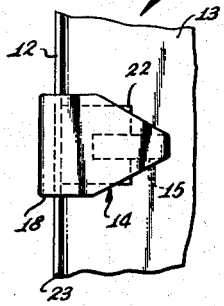
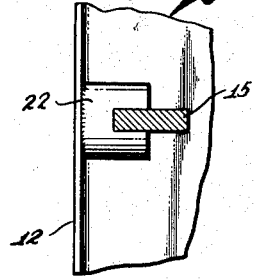
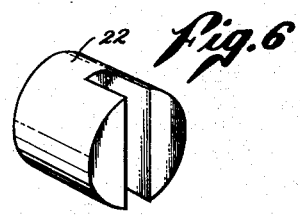
INVENTOR.
EDWARD L. VALENTINE
BY *Arthur E. Baker*
                                     Attorney United States Patent Office 2,695,453
Patented Nov. 30, 1954

2,695,453

DIP STICK LIQUID MEASURING APPARATUS

Edward L. Valentine, Pico, Calif.

Application November 28, 1951, Serial No. 258,697

2 Claims. (Cl. 33—126.7)

This invention relates to an apparatus for measuring the level of a liquid contained in a large tank, and more particularly relates to a dip stick liquid level measuring apparatus which is capable of great accuracy. The invention will be particularly illustrated as embodied in an improved dip stick liquid level measuring apparatus which is employed to measure the level of bulk milk in large dairy tanks.

The method of measuring the level of a liquid in a tank by means of a dip stick has been known for a long time, and it has been widely employed, since it has several very real advantages over other methods of liquid level measurement. Thus, it is rapid, simple, and economical, very little actual apparatus being required, and the necessary operations being few and quickly carried out. However, until very recently it has never been seriously contended that the dip stick method was very accurate, and where accuracy has been a prime consideration, it has been found necessary to employ more complicated systems based on the use of floats, gauges, and other like apparatus.

It is a further object to provide a very accurate dip stick liquid level measuring apparatus.

It is a more particular object to provide a very accurate dip stick liquid level measuring apparatus which is especially suitable for the measurement of milk contained in large dairy tanks.

It is a further object to provide a dip stick liquid level measuring apparatus which includes a dip stick and means for guiding its entrance into a tank.

It is a further object of the invention to provide an improved dip stick liquid level measuring apparatus for use in a large tank whereby a dip stick can be introduced into liquid in the tank without causing any considerable turbulence in the liquid.

It is a further object of the invention to provide an improved dip stick liquid level measuring apparatus wherein the dip stick when in use can easily be maintained with its length perpendicular to the plane of the bottom of a tank, and with its width perpendicular to the plane of the wall of a tank.

It is a further object of the invention to provide an improved dip stick liquid level measuring apparatus wherein when the dip stick is immersed in a liquid to the reading position, it is so positioned that it can be easily read without being moved within or removed from the liquid.

It is a further object to provide an improved dip stick liquid level measuring apparatus wherein the dip stick can always be made to assume a uniform and motionless position, with respect to the tank containing the liquid, each time that it is employed to measure the liquid level.

It is a further object of the invention to provide an improved dip stick liquid level measuring apparatus wherein the dip stick when fully introduced into the tank to the reading level is then maintained in an immovable position unless lifted.

It is a further object to provide an improved combination of a dairy tank and dip stick liquid level measuring apparatus.

Other objects, together with some of the advantages to be derived in utilizing the present invention, will become apparent from the following description, taken together with the accompanying drawings, wherein:

Figure 1 is a view in side elevation of my dip stick measuring apparatus, showing the dip stick fully lowered into and positioned for measuring the liquid level within a tank;

Figure 2 is another view in side elevation of my dip stick measuring apparatus, showing the dip stick in an intermediate position, such as it could assume when it was being introduced into or removed from a tank;

Figure 3 is a view in front elevation, or more particularly a view showing the appearance of the upper portion of my dip stick measuring apparatus from a position indicated by the numeral 3 on Figure 1;

Figure 4 is a view in plan, or more particularly a view showing the appearance of the apparatus from the position indicated by the numeral 4 on Figure 1;

Figure 5 is a view in section taken on the section line 5—5, which shows the relationship of the blade portion of the dip stick and the slotted guide; and Figure 6 is a view in perspective of the slotted guide which is normally fixedly attached to the wall of the tank.

Referring now to the drawings and particularly to Figure 1, the numeral 10 generally designates a dip stick which is shown in a fully lowered position within a tank 11, the tank being delineated by a side wall 12 and a bottom 13. In this position, if there is any liquid in the tank, the stick will be immersed in it, and may be read directly while it remains in the position shown, or if preferred may be withdrawn and read by noting the highest level on the stick to which the liquid has risen.

My dip stick 10 is made in the general configuration of a thick blade or rule, and is manufactured preferably from stainless stock approximately ¼ inch thick and 1 inch wide. As shown in Figure 1, it includes an upper enlarged hanging head 14, a blade 15, and a lower foot portion 16. The enlarged hanging head 14 consists of a hanger 17 and a hanger lip 18. The lower foot portion 16 consists of a toe 19 and a foot guide 21. Between the upper hanging head 14 and the lower foot portion 16, the blade 15 may be graduated, so that when calibrated liquid volumes may be read directly.

Some idea of the accuracy of my improved dip stick measuring the level of liquids may be appreciated from the fact that in practice my dip stick is graduated in thirty-seconds, and with it I am able to measure the liquid level in even a fairly large tank to this considerable degree of accuracy.

One part of my dip stick liquid level measuring apparatus, a blade guide 22, is not integral with the dip stick 15, but is fixedly attached to the wall 12 as by welding, etc. It is slotted, as clearly shown in Figure 6, to allow the blade 15 to just fit into it in a slidable relationship.

When not in use, the dip stick 10 is stored outside the tank. When a reading is desired the stick is lowered into the tank in a manner which is believed to be clear from Figures 1 and 2. Thus in accordance with the invention, as the stick is lowered it is maintained with its length perpendicular to the bottom 13 and its width perpendicular to the wall 12, at all times. It is possible to so maintain it due to the combined effect of the blade guide 22, which effectively retains the blade 15 in its perpendicular relationship with the wall, and of the foot guide 19, which is in contact with the wall at all times that the stick is being lowered, and serves to hold the stick perpendicular to the bottom and also to prevent or lessen any whipping or tyne effect. In this manner only the very minimum of disturbance is caused to the liquid, which might otherwise become turbulent and splash up on the stick to cause an error.

When the stick 10 has reached the lowest point that is intended, it is brought to a smooth stop in its descent by the engagement of the hanger lip 18 with the edge 23 of the tank wall 12. The foot portion 16 is therefore not allowed to touch bottom with a resultant jar which, if allowed, could cause sufficient disturbance within the liquid to give a considerable error.

When the dip stick 10 is in the position shown in Figure 1, it is in its proper indicating position. In this position, due to the interaction of the hanger lip 18 and the foot guide 21, it is immovably positioned so that even a jar on the tank will not cause any movement of the blade 15.

From the foregoing it is apparent that the invention provides a dip stick liquid level measuring apparatus which will accomplish all the objects hereinbefore set forth.

While I have described the salient features of this invention in detail with respect to one embodiment, this embodiment is to be taken as a preferred example of the same, and it will of course be apparent that other modifications may be made within the spirit and scope of this invention, and I do not therefore desire to limit the invention to the exact details shown except insofar as they may be defined in the following claims.

I claim:

1. In a device of the character described, the combination of a liquid receptacle having vertical side walls, a guide member fixedly attached to the inner surface of one of the vertical side walls of said liquid receptacle, a measuring device comprising a substantially flat metal blade having a lower portion of increased width, said guide member projecting into said liquid receptacle and having a vertically extending inwardly open slot to receive the central portion of said measuring device, and serve with said lower portion of increased width to maintain said measuring device in a vertical position, with its width perpendicular to said side wall of said tank, and with its length parallel to said side wall of said tank.

2. In a device of the character described, the combination of a liquid receptacle having vertical side walls, a guide member fixedly attached to the inner surface of one of the vertical side walls of said liquid receptacle, a measuring device comprising a substantially flat metal blade having a lower portion of increased width and an upper handle portion having a downwardly extending lip adapted to engage the upper edge of the wall of said tank to support said measuring device in a vertical position in said tank, said guide member projecting into said liquid receptacle and having a vertically extending inwardly open slot to receive the central portion of said measuring device, and serve with said lower portion of increased width to maintain said measuring device in a vertical position, with its width perpendicular to said side wall of said tank, and with its length parallel to said side wall of said tank.

References Cited in the file of this patent

UNITED STATES PATENTS

| Number | Name | Date |
| --- | --- | --- |
| 1,248,818 | Crouse | Dec. 4, 1917 |
| 1,421,672 | Clarke | July 4, 1922 |
| 1,515,398 | Marcussen | Nov. 11, 1924 |
| 1,658,774 | Taub | Feb. 7, 1928 |
| 1,681,431 | Pribil | Aug. 21, 1928 |
| 1,717,188 | Ciomei | June 11, 1929 |
| 1,776,942 | Deutsch | Sept. 30, 1930 |
| 2,029,345 | Talbot | Feb. 4, 1936 |
| 2,039,965 | Lees et al. | May 5, 1936 |